US009330656B2

(12) United States Patent
Nakano et al.

(10) Patent No.: US 9,330,656 B2
(45) Date of Patent: May 3, 2016

(54) SPEECH DIALOGUE SYSTEM AND SPEECH DIALOGUE METHOD

(71) Applicant: HONDA MOTOR CO., LTD., Tokyo (JP)

(72) Inventors: Mikio Nakano, Wako (JP); Kazunori Komatani, Nagoya (JP); Tsugumi Otsuka, Nagoya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 14/190,505

(22) Filed: Feb. 26, 2014

(65) Prior Publication Data
US 2014/0249826 A1 Sep. 4, 2014

(30) Foreign Application Priority Data
Mar. 1, 2013 (JP) .................................. 2013-040742

(51) Int. Cl.
*G10L 13/027* (2013.01)
*G10L 15/22* (2006.01)

(52) U.S. Cl.
CPC ............... *G10L 13/027* (2013.01); *G10L 15/22* (2013.01)

(58) Field of Classification Search
CPC .............................. G10L 13/027; G10L 15/22
USPC ................................................ 704/234–245
See application file for complete search history.

(56) References Cited

U.S. PATENT DOCUMENTS

| 7,181,471 B1* | 2/2007 | Ibuki ................. G06F 17/30719 |
| 2006/0271364 A1* | 11/2006 | Mirkovic ................ G06F 17/28 704/239 |
| 2013/0066886 A1* | 3/2013 | Bagchi ............. G06F 17/30654 707/749 |

FOREIGN PATENT DOCUMENTS

JP 2002-288155 A 10/2002

OTHER PUBLICATIONS

Ayumi Yamamoto et al., "Automatic Collection of People's Information form the World Wide Web," The Institute of Electronics, INformation and Communication Engineers, Technical Research Report, AI, Artificial Intelligence and Knowledge Processing, vol. 99, No. 534, pp. 93-100, Jan. 2000.

(Continued)

*Primary Examiner* — Marcellus Augustin
(74) *Attorney, Agent, or Firm* — Squire Patton Boggs (US) LLP

(57) ABSTRACT

A speech dialogue system generates a response sentence in a way to improve the efficiency of the dialogue with the user, based on a result of estimation on an attribute of a proper name in an utterance of a user. The system includes a database attribute estimation unit to estimate the attribute of the input proper name by utilizing a database, and a web attribute estimation unit to estimate an attribute of an input proper name by utilizing information on the web. A reliability integration unit calculates integrated reliability of estimation for each of possible attributes obtained from the estimation by the units, by integrating first reliability of the estimation. A response generation unit generates a response sentence to an input utterance based on the integrated reliabilities of the possible attributes.

4 Claims, 4 Drawing Sheets

(56) References Cited

OTHER PUBLICATIONS

Naoki Yoshinaga et al., "Automated Acquisition of Attribute/Attribute Value Information of Specific Matter from Web," The Association for Natural Language Processing, 13th Annual Meeting, Presented Paper, 2007, 4 pages.

Adam L. Berger et al., "A Maximum Entropy Approach to Natural Language Processing," Computational Linguistics, vol. 22, No. 1, Mar. 1996, pp. 39-71.

* cited by examiner

SPEECH DIALOGUE SYSTEM AND SPEECH DIALOGUE METHOD

FIELD OF THE INVENTION

The present invention relates to a speech dialogue system and a speech dialogue method for having a dialogue with a user by generating a response sentence to a speech input from the user.

BACK GROUND OF THE INVENTION

Determining an attribute of each proper name in an utterance of the user is an important task of the speech dialogue system for having a dialogue with the user. As an example, a situation where a user gives an utterance including a proper name of a restaurant in a certain area and the speech dialogue system determines an attribute (category) of the restaurant such as Japanese-style pub, Chinese restaurant, and cafe, is described below. First, the following two dialogue examples are considered.

EXAMPLE 1

User: Please tell me about "Toyo".
System: I don't know this restaurant. I'll memorize it. What is the category of this restaurant?

EXAMPLE 2

User: Please tell me about "Osteria LIU".
System: I don't know this restaurant. I'll memorize it. It must be an Italian restaurant, isn't it?

In Example 1, the speech dialogue system does not make any estimation but asks a simple question. In this case, the user is free to select a response sentence to that question, so that the user might utter a new unknown word. In contrast, in Example 2, the user's response sentence to the question from the speech dialogue system is limited to Yes or No. In this way, the speech dialogue system may improve the efficiency of dialogue by making possible estimation on contents of the utterance and asking a more specific question based on the estimation. That is, the speech dialogue system is expected to improve the efficiency of dialogue by making estimation on the attribute of the proper name in the utterance of the user and generating an appropriate response sentence.

Typically, a database is used to estimate an attribute of a proper name from said proper name itself (e.g., in the case described above, a database of restaurants in the area is used). However, a proper name in an utterance of a user may not be stored in the database. Therefore, information from the World Wide Web (hereinafter referred to as "the web") is also used to determine the attribute (see Non-Patent Document 1 and 2, for example).

PRIOR ART DOCUMENT

Non-Patent Document 1: Ayumi Yamamoto and Satoshi Sato, "Automated Collection of Personal Information from World Wide Web", The Institute of Electronics, Information and Communication Engineers, Technical Research Report, AI, Artificial Intelligence and Knowledge Processing, vol. 99, No. 534, pp. 93-100, 2000.

Non-Patent Document 2: Naoki Yoshinaga and Kentaro Torizawa, "Automated Acquisition of Attribute/Attribute Value Information of Specific Matter from Web", The Association for Natural Language Processing, 13th Annual Meeting, Presented Paper, 2007.

SUMMARY OF THE INVENTION

Problem to be Solved

However, a speech dialogue system and a speech dialogue method to generate a response sentence in a way to improve the efficiency of the dialogue with the user, based on a result of estimation on an attribute of a proper name in an utterance of a user, has not been developed. Therefore, there are needs for the speech dialogue system and the speech dialogue method to generate a response sentence in a way to improve the efficiency of the dialogue with the user, based on a result of estimation on an attribute of a proper name in an utterance of a user.

Solution to the Problem

A speech dialogue system according to a first aspect of the present invention comprises a processor and one or more memories. And the processor is configured to estimate an attribute of an input proper name by using information stored in a database, estimate the attribute of the input proper name by using information obtained from the web, and calculate integrated reliability of estimation for each of possible attributes obtained from the estimation based on the database and the web, by integrating first reliability and second reliability. The first reliability is reliability of estimation based on the information stored in the database, and the second reliability is reliability of estimation based on the information obtained from the web. The processor is further configured to generate a response sentence to an input utterance on the basis of the integrated reliability of the possible attributes.

According to this aspect, the response sentence to the input utterance is generated based on the integrated reliability for each of the possible attributes, obtained by integrating the first reliability of estimation based on the database and the second reliability of estimation based on the web, so that efficiency of a dialogue with a user may be improved.

In the speech dialogue system according to a first embodiment of the first aspect, the processor is further configured to list the possible attributes in descending order of the integrated reliability, calculate a sum of the integrated reliability by summing the highest values of the integrated reliability in the descending order, obtain the minimum number of the possible attributes having the highest values of the integrated reliability which gives the sum greater than a predetermined threshold value, and generate the response sentence according to the minimum number of the possible attributes.

According to this embodiment, the response sentence is generated by limiting the number of the possible attributes having highest values of the integrated reliability, so that the efficiency of the dialogue with the user may be improved.

In the speech dialogue system according to a second embodiment of the first aspect, the processor is further configured to calculate the integrated reliability as a weighted sum of the first reliability and the second reliability.

According to this embodiment, a correct answer rate of the estimation may be improved by calculating the integrated reliability as the weighted sum of the first reliability and the second reliability based on different kinds of information.

In the speech dialogue system according to a third embodiment of the first aspect, the processor is further configured to use features selected on the basis of the mutual information between the feature of the proper name and the attribute when the processor estimates the attribute of the input proper name by using information stored in the database.

According to this embodiment, over-training in the estimation based on the database may be avoided.

A speech dialogue method according to a second aspect of the present invention includes a step of estimating an attribute of an input proper name by using information stored in a database and a step of estimating the attribute of the input proper name by using information obtained from the web. The method also comprises a step of calculating integrated reliability of estimation for each of possible attributes obtained from the estimation based on the database and the web, by integrating first reliability and second reliability. The first reliability is reliability of estimation based on the information stored in the database, and the second reliability is reliability of estimation based on the information obtained from the web. The method further comprises a step of generating a response sentence to an input utterance on the basis of the integrated reliability of the possible candidates.

According to this aspect, the response sentence to the input utterance is generated based on the integrated reliability for each of the possible attributes, obtained by integrating the first reliability of the estimation based on the database and the second reliability of the estimation based on the Web, so that the efficiency of the dialogue with the user may be improved.

DESCRIPTION OF EMBODIMENTS

Figure 1:
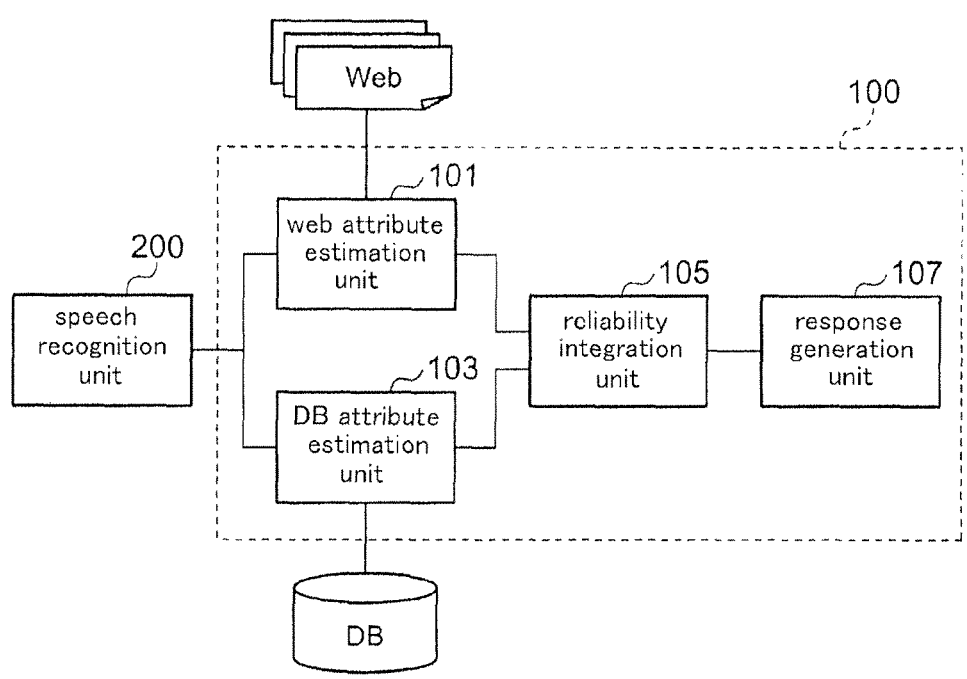
FIG. 1 shows a configuration of a speech dialogue system according to an embodiment of the present invention.

FIG. 1 shows a configuration of a speech dialogue system 100 according to an embodiment of the present invention. The system 100 includes a web attribute estimation unit 101 to estimate an attribute of an input proper name by utilizing information on the web, and a database attribute estimation unit 103 to estimate the attribute of the input proper name by utilizing a database. The system also includes a reliability integration unit 105 to calculate integrated reliability of estimation for each of possible attributes obtained from the estimation by the units 101 and 103, by integrating first reliability of the estimation performed by the unit 103 with second reliability of the estimation performed by the unit 101. The system further includes a response generation unit 107 to generate a response sentence to an input utterance based on the integrated reliabilities of the possible attributes. The proper name is input from a speech recognition unit 200. As is clear for a person skilled in the art, these units may be realized by a computer(s) executing a software program(s). The computer may comprise a processor(s) and a memory (or memories).

Figure 2:
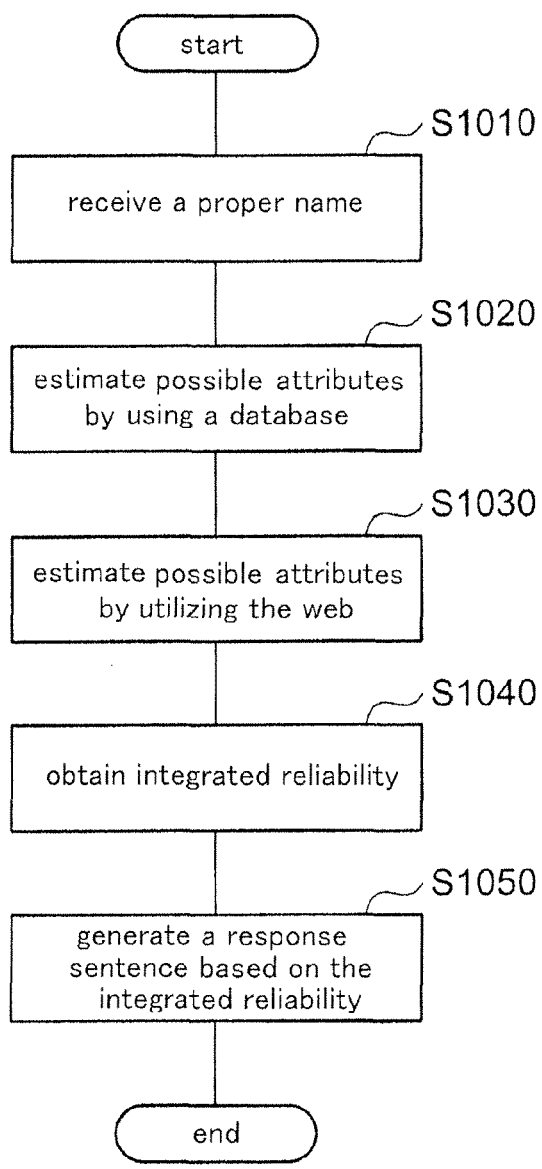
FIG. 2 is a flow diagram for illustrating operation of the speech dialogue system.

FIG. 2 is a flow diagram for illustrating operation of the speech dialogue system 100.

At step S1010 in FIG. 2, the system 100 receives a proper name in an utterance of a user from the speech recognition unit 200.

At step S1020 in FIG. 2, the database attribute estimation unit 103 estimates a category of a restaurant indicated by the proper name as its attribute, using the database. This estimation is performed with machine learning methods, using restaurant names $s_i \in S$ in the database as input and using their categories $g_j \in G$ as output.

A maximum entropy model (hereinafter, referred to as "ME") (see Adam L. Berger, Vincent J. Della Pietra, and Stephen A. Della Pietra, "A maximum entropy approach to natural language processing", Comput. Linguist., Vol. 22, No. 1, pp. 39-71, March 1996.) is used in the machine learning. Posterior probability $p(g_j|s_i)$ obtained by the ME is considered as a reliability $CM_D(g_j)$ of estimation based on the database, as shown in the following equation (1), $$CM_D(g_j) = p(g_j|s_i) = \frac{1}{Z}\exp[\vec{\lambda} \cdot \vec{\phi}(s_i, g_j)], \qquad (1)$$

where $\vec{\phi}(s_i, g_j)$ represents a feature vector relating to the category $g_j$ and the restaurant name $s_i$, $\vec{\lambda}$ represents a weight for the feature vector, and Z represents a normalization factor for ensuring $\Sigma_{g_j} CM_D(g_j)=1$.

As learning data, the restaurant names and their categories in the database, and following features generated from each of the restaurant names are used.

n-gram of characters in the restaurant name (n=1, 2, 3)
Morpheme string of the restaurant name
Character type of the restaurant name Herein, the Mecab is used for the morphological analysis with the dictionary IPADIC. The character type includes hiragana, katakana, Chinese character, and alphabet. For example, in a case where a restaurant name includes katakana characters and alphabets, the character type is "katakana+alphabet".

Preferably, the feature is selected based on the mutual information between the feature and the category. The mutual information can be expressed as a following formula (2).

$$I(f_k; G) = \sum_{g_j \in G} p(f_k, g_j)\log\frac{p(f_k, g_j)}{p(f_k)p(g_j)}, \qquad (2)$$

where $p(f_k)$ and $p(g_j)$ represent normal probabilities of the feature $f_k$ generated from the learning data and that of the category $g_j$, respectively, and $p(f_k, g_j)$ represents a joint probability. Only a predetermined percentage of the features are used, which are selected in descending order from the top of the highest ranking of the score of $I(f_k; G)$. The predetermined percentage will be described below.

At step S1030 in FIG. 2, the web attribute estimation unit 101 estimates the category of the restaurant indicated by the proper name as its attribute, utilizing information on the web. First, a search query is set to "<restaurant name for searching>area (e.g., Aichi prefecture) restaurant". Next, tags were removed from an HTML file obtained as a search result. With respect to the HTML file without tags, a frequency $h(g_j)$ of each category corresponding to the category $g_j$ in the database is obtained. The obtained frequencies are normalized by a following formula, and a list of categories (i.e., attributes) in descending order of the reliability score $CM_W$ calculated based on information on the web is output.

$$CM_W(g_j) = \frac{h(g_j)}{\sum_{g_l \in G} h(g_l)} \quad (3)$$

At step S1040 in FIG. 2, the reliability integration unit 105 calculates integrated reliability $CM_I$ from the reliability $CM_D$ based on the database and the reliability $CM_W$ based on the web. The integrated reliability may be calculated as a weighted sum of both reliabilities, $CM_D$ and $CM_W$.

At step S1050 in FIG. 2, the response generation unit 107 generates a response sentence based on the integrated reliability.

Figure 3:
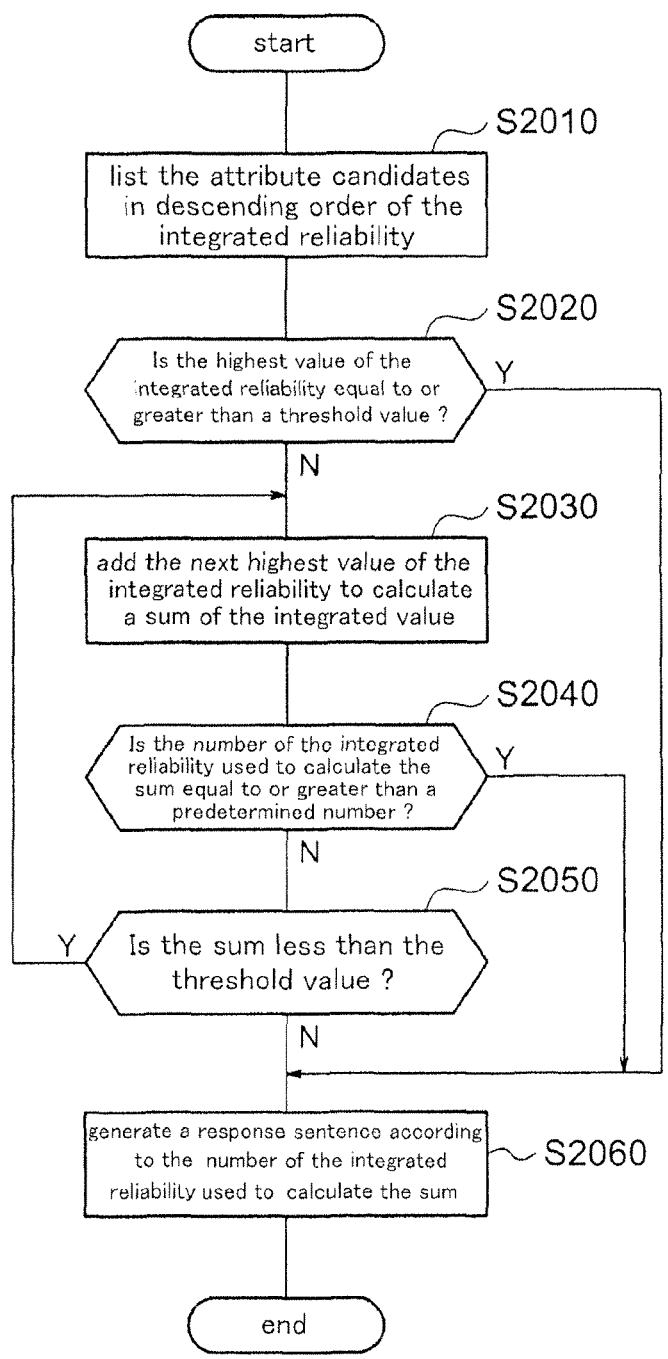
FIG. 3 is a flow diagram for illustrating a procedure of a response generation unit to generate a response sentence based on integrated reliability.

FIG. 3 is a flow diagram for illustrating details of the procedure performed at step S1050 in FIG. 2, in which the response generation unit 107 generates the response sentence based on the integrated reliability.

At step S2010 in FIG. 3, the response generation unit 107 lists the attributes in descending order of the integrated reliability.

At step S2020 in FIG. 3, the response generation unit 107 determines whether the highest value of the integrated reliability is equal to or greater than a predetermined threshold value. If the highest value is equal to or greater than the threshold value, the procedure proceeds to step S2060. If the highest value is less than the threshold value, the procedure proceeds to step S2030.

At step S2030 in FIG. 3, the response generation unit 107 obtains a sum of the integrated reliability by adding the next highest value of the integrated reliability to the highest value of that.

At step S2040 in FIG. 3, the response generation unit 107 determines whether the number of the integrated reliability used for the calculation of the sum of the integrated reliability, i.e., the number of candidates for the attribute (hereinafter also referred to as "attribute candidates"), is equal to or greater than a predetermined number. If the number is equal to or greater than the predetermined number, the procedure proceeds to step S2060. If the number is less than the predetermined value, the procedure proceeds to step S2050.

At step S2050 in FIG. 3, the response generation unit 107 determines whether the sum of the integrated reliability is less than the predetermined threshold value. If the sum is less than the threshold value, the procedure returns to step S2030 to add the further next highest value of the integrated reliability to the sum of the integrated reliability. If the sum is equal to or greater than the threshold value, the procedure proceeds to step S2060.

At step S2060 in FIG. 3, the response generation unit 107 generates the response sentence using the attribute candidates as many as the number of the candidates obtained in the way described above. The number of the candidates can be expressed as the following equation by using the integrated reliability $CM_I(g_j)$, $$num = \min(n) \text{ s.t. } \sum_{j=1}^{n} CM_I(g_j) > \theta, \quad (4)$$

where j represents a rank of $CM_I(g_j)$ in their list in descending order, and θ represents the threshold value used in steps S2020 and S2050 of the flow diagram shown in FIG. 3.

Table 1 shows examples of the response sentence generated according to the number (num) of the candidates.

TABLE 1

| Num | Response Style | Example of Response |
|---|---|---|
| 1 | Yes/No style | A is $g_1$, isn't it? |
| 2 | Two-alternative choice style | Which one is A, $g_1$ or $g_2$? |
| 3 | Threefold choice style | Which one is A, $g_1$, $g_2$, or $g_3$? |
| 4 or greater | 5W1H style | What is the category of A? |

For example, in the case of num=1, that is, in the case where $CM_I(g_1)$ in the first rank (having the highest value) is greater than θ, only one corresponding attribute candidate is included in the response sentence as a question item. In this scheme, the reduction of the number (num) of the attribute candidates results in the limitation of contents of the user response sentence, so that the efficiency of the dialogue with a user may be improved by generating the response sentence according to the reduced number (num) of the attribute candidates.

Next, the effectiveness of both the reliability based on the database and the reliability based on the web, as a measure of the correctness of the estimated attributes, will be described using an example.

In this example, the number of restaurants in a certain area registered in the database is 2398. 400 restaurants are extracted from the database for evaluation. The remaining 1998 restaurants are used as the learning data for the estimation based on the database. And 203 types of features which correspond to the top 0.8% of the features listed in descending order of the score of the mutual information are used. The correct answer is defined as the attribute candidate with the highest value of $CM(g_j)$ coinciding with the true attribute.

Next, the selection of features during the estimation based on the database is described. With respect to the features which correspond to upper x % of the features listed in descending order of the score of the mutual information, the correct answer rate of the closed test and that of the open test are compared to each other. The correct answer rate is defined here as the value obtained by dividing by 2398 the number of cases where $g_i$ giving the highest value of $CM_D(g_i)$ coincides with the true attribute. In the open test, 10-fold cross validation for 2398 restaurants in the target database is used. The correct answer rate of the closed test results to 100% at x=100%, and this rate decreases as x decreases. And, at x=0.8% (203 types), the correct answer rate of the closed test and that of the 10-fold cross validation have substantially a same value. Therefore, x=0.8% (203 types) of features are selected, considering that the over-training is avoided at that condition.

Table 2 shows the number of correct answers and the number of failures in both cases where the reliability $CM_D$ based on the database and the reliability $CM_W$ based on the web are used, respectively. In Table 2, the numbers are shown for each value interval of the corresponding reliability CM.

TABLE 2

| | $CM_D$ | | $CM_W$ | |
|---|---|---|---|---|
| CM | Number of correct answers | Number of failures | Number of correct answers | Number of failures |
| 0.0 to 0.1 | 0 | 0 | 0 | 34 |
| 0.1 to 0.2 | 0 | 0 | 5 | 18 |
| 0.2 to 0.3 | 1 | 16 | 28 | 46 |
| 0.3 to 0.4 | 6 | 19 | 47 | 20 |
| 0.4 to 0.5 | 11 | 25 | 62 | 13 |
| 0.5 to 0.6 | 21 | 29 | 69 | 4 |

TABLE 2-continued

|  | $CM_D$ | | $CM_W$ | |
| --- | --- | --- | --- | --- |
| CM | Number of correct answers | Number of failures | Number of correct answers | Number of failures |
| 0.6 to 0.7 | 22 | 28 | 35 | 3 |
| 0.7 to 0.8 | 41 | 16 | 13 | 0 |
| 0.8 to 0.9 | 21 | 9 | 1 | 0 |
| 0.9 to 1.0 | 131 | 4 | 1 | 1 |
| Total | 254 | 146 | 261 | 139 |

Figure 4:
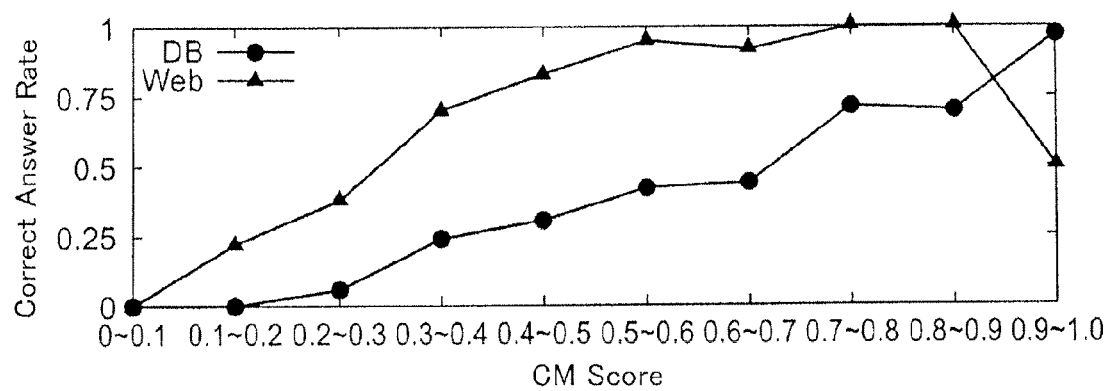
FIG. 4 is a graph indicating the correct answer rate for each of CM scores.

FIG. 4 is a graph indicating the correct answer rate for each of the CM scores. In FIG. 4, the abscissa indicates the value interval of CM and the ordinate indicates the correct answer rate in each of the CM value intervals, where the correct answer rate=the number of correct answers/(the number of correct answers+the number of failures). From the tendency of the correct answer rate increasing with the value of CM for both cases of $CM_D$ and $CM_W$ as may be seen in FIG. 4, and from the result shown in Table 2, it is confirmed that CM is effective as the measure of the correctness of the estimated attribute.

As may be seen in Table 2, most of the correct answers in the case of $CM_D$ are distributed within the CM value range from 0.5 to 1.0, while most of correct answers in the case of $CM_W$ are distributed within the CM value range from 0.2 to 0.7. This means that information stored in the database has different characteristics from those of information obtained from the web. Consequently, the correct answer rate of the estimation may be improved by utilizing a combination of both information from the database and the web.

REFERENCE SIGNS LIST 100 speech dialogue system
101 web attribute estimation unit
103 database attribute estimation unit
105 reliability integration unit
107 response generation unit

The invention claimed is:

1. A speech dialogue system comprising a processor and one or more memories,
the processor configured to:
estimate an attribute of an input proper name by using information stored in a database;
estimate the attribute of the input proper name by using information obtained from the web;
calculate integrated reliability of estimation for each of possible attributes obtained from the estimation based on the database and the web, by integrating first reliability and second reliability, the first reliability being reliability of estimation based on the information stored in the database, the second reliability being reliability of estimation based on the information obtained from the web;
generate a response sentence to an input utterance on the basis of the integrated reliability of the possible attributes;
list the possible attributes in descending order of the integrated reliability;
calculate a sum of the integrated reliability by summing the highest values of the integrated reliability in the descending order;
obtain the minimum number of the possible attributes having the highest values of the integrated reliability which gives the sum greater than a predetermined threshold value; and
generate the response sentence according to the minimum number of the possible attributes.

2. The speech dialogue system according to claim 1, wherein
the processor is configured to calculate the integrated reliability as a weighted sum of the first reliability and the second reliability.

3. The speech dialogue system according to claim 1, wherein
the processor is configured to use features selected on the basis of the mutual information between the feature of the proper name and the attribute when the processor estimates the attribute of the input proper name by using information stored in the database.

4. A speech dialogue method comprising steps of:
estimating an attribute of an input proper name by using information stored in a database;
estimating the attribute of the input proper name by using information obtained from the web;
calculating integrated reliability of estimation for each of possible attributes obtained from the estimation based on the database and the web, by integrating first reliability and second reliability, the first reliability being reliability of estimation based on the information stored in the database, the second reliability being reliability of estimation based on the information obtained from the web;
generating a response sentence to an input utterance on the basis of the integrated reliability of the possible candidates;
listing the possible attributes in descending order of the integrated reliability;
calculating a sum of the integrated reliability by summing the highest values of the integrated reliability in the descending order;
obtaining the minimum number of the possible attributes having the highest values of the integrated reliability which gives the sum greater than a predetermined threshold value; and
generating the response sentence according to the minimum number of the possible attributes.

* * * * *